Jan. 4, 1927.
M. HOWELLS
1,613,514
DISPENSING CABINET
Original Filed Oct. 27, 1922   3 Sheets-Sheet 2
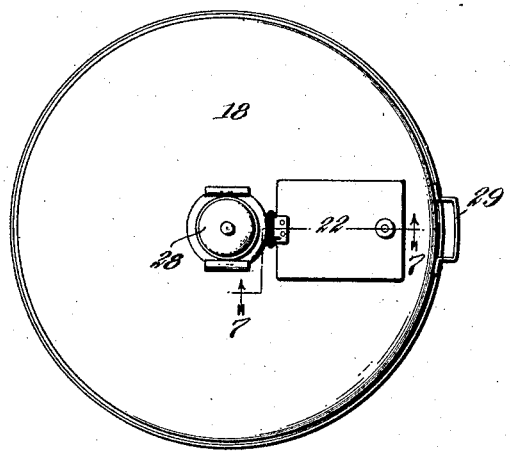
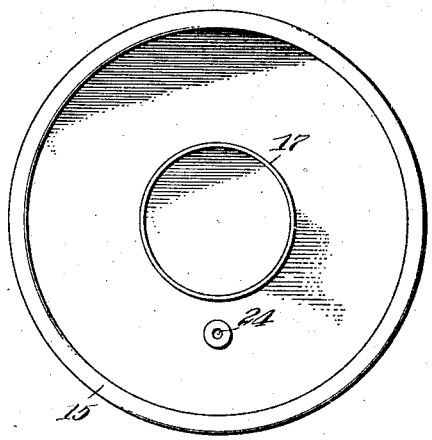
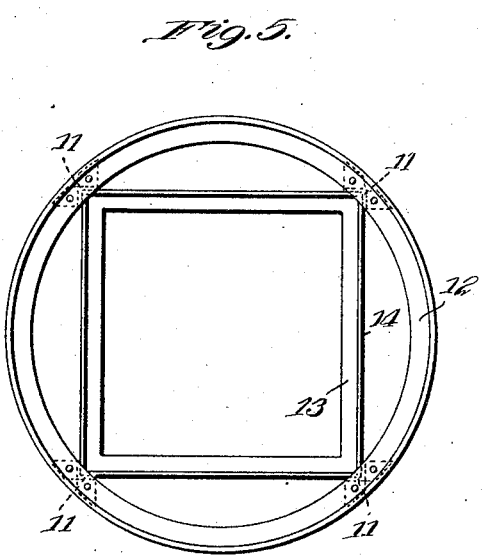
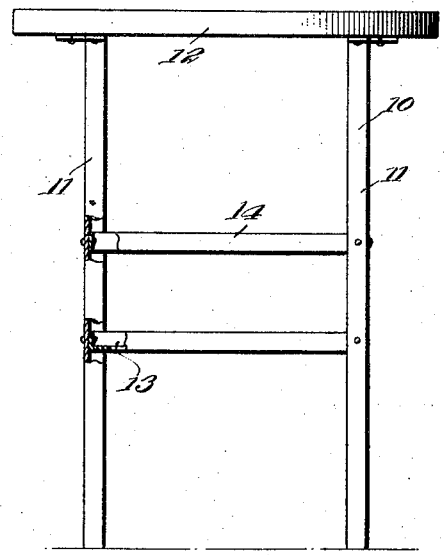
Morgan Howells
INVENTOR
BY Victor J. Evans
ATTORNEY
WITNESS:

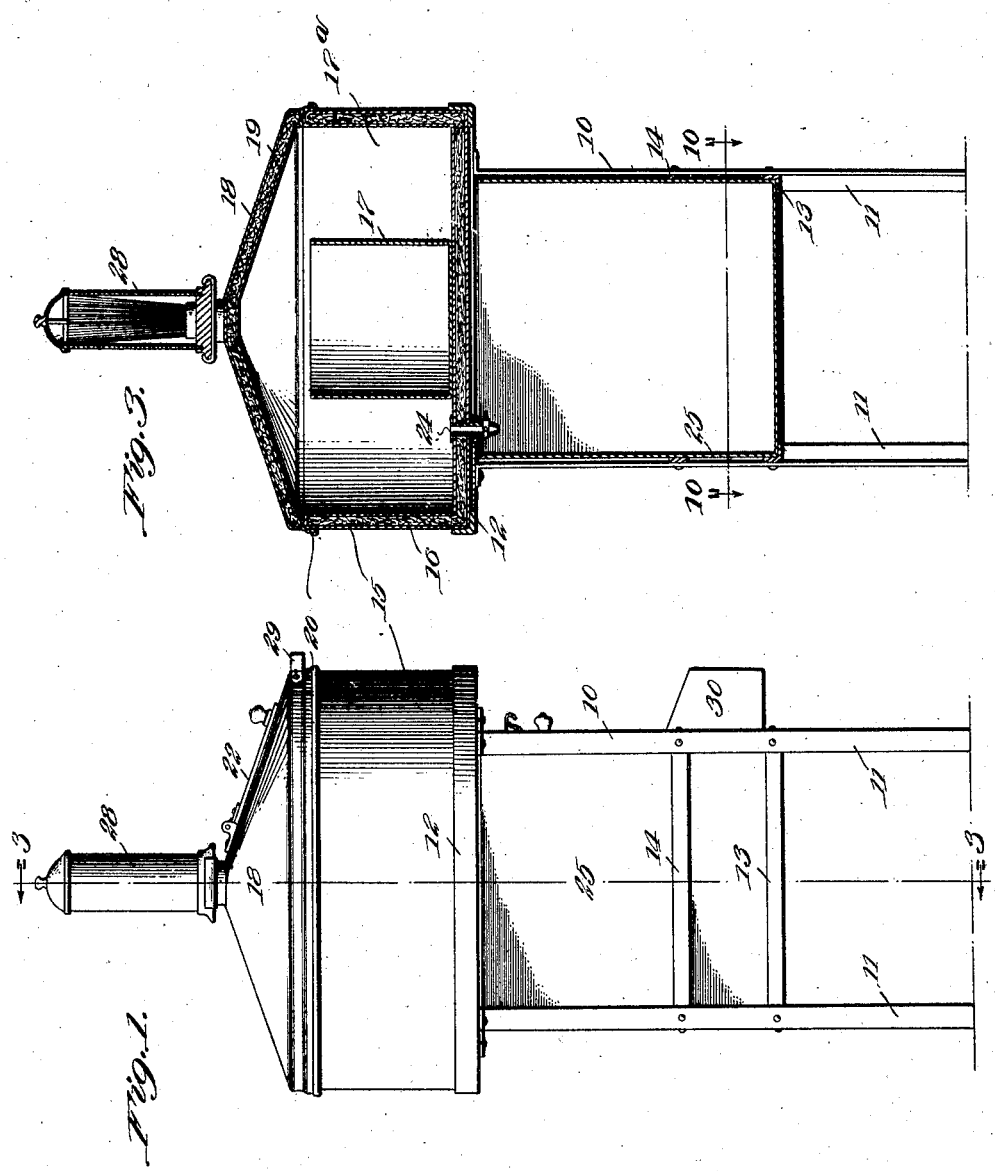

Jan. 4, 1927.
M. HOWELLS
1,613,514
DISPENSING CABINET
Original Filed Oct. 27, 1922    3 Sheets-Sheet 3
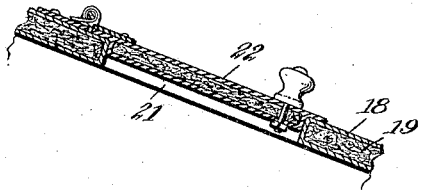
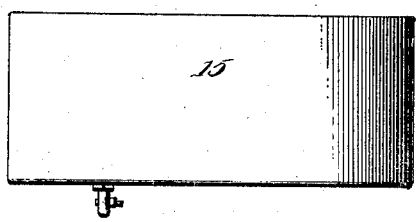
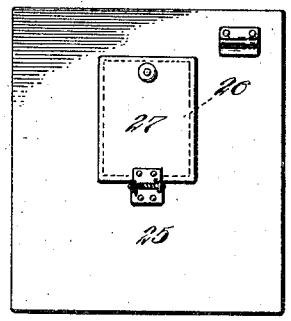
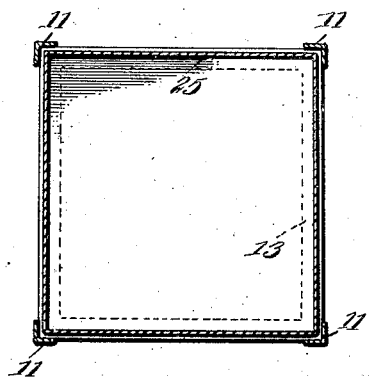

Patented Jan. 4, 1927.

1,613,514

UNITED STATES PATENT OFFICE.

MORGAN HOWELLS, OF ATLANTA, GEORGIA, ASSIGNOR TO ICY-OMETAL PRODUCTS COMPANY, OF ATLANTA, GEORGIA, A CORPORATION OF GEORGIA.

DISPENSING CABINET.

Application filed October 27, 1922, Serial No. 597,354. Renewed September 27, 1926.

This invention relates to containers and has for an object the provision of an insulated container body which is especially designed for receiving and dispensing bottled goods, whereby the latter may be kept on sale in a cool and palatable condition and conveniently reached.

Another object of the invention is the provision of means whereby the contents of the container may be easily reached without appreciably lowering the temperature of the inside of the container.

Another object of the invention is the provision of a device of the above character which includes in addition to a compartment for containing goods to be sold, also contains a compartment for empty bottles, the latter acting to reinforce and stiffen the supporting structure for the container and providing together with said container an ornamental and convenient unitary structure especially adapted for the purpose intended With the above and other objects in view, the invention further includes the following novel features and details of construction, to be hereinafter more fully described, illustrated in the accompanying drawings and pointed out in the appended claims.

In the drawings:—

Figure 1 is an elevation of the invention.

Figure 2 is a top plan view of the same.

Figure 3 is a vertical sectional view on the line 3—3 of Figure 1.

Figure 4 is a plan view of the container with the cover removed.

Figure 5 is a top plan view of the supporting frame.

Figure 6 is a side elevation of the same.

Figure 7 is an enlarged fragmentary section taken on the line 7—7 of Figure 2.

Figure 8 is a side elevation of the container removed from the supporting frame.

Figure 9 is a similar view of the receptacle or compartment for empty bottles.

Figure 10 is a sectional view on the line 10—10 of Figure 3.

Figure 11 is a vertical sectional view of the cap receptacle removed from the cabinet.

Figure 12 is a top plan view of the same.

The invention is especially designed for the convenient sale of bottled goods, such as soft drinks and the like and may contain drinks of one or more varieties, the purpose being to keep these drinks in a cool and palatable condition in a manner to permit of their ready removal.

For this purpose, the invention provides a supporting frame 10 which includes vertically disposed angle bars or standards 11 which are connected together at their upper ends by a circular frame 12 of substantially L-shaped cross section. This provides a supporting flange and a retaining flange, the purposes of which will be hereinafter apparent. Spaced below the frame 12 is a horizontally arranged rectangular frame 13, which is also of L-shaped cross-section so as to provide a supporting flange and a retaining flange, while spaced above the frame 13 is a frame 14, the dimensions of the frames 13 and 14 being contained within the circumference of the frame 12, as clearly shown in Figure 5 of the drawings.

Removably mounted upon the frame 12 is a container 15, whose bottom and side walls are preferably of double construction so as to provide space for insulating material 16. Located within the container 15 which is of cylindrical shape, is a concentrically arranged preferably cylindrical compartment 17 designed for holding ice. The space around the compartment 17 is designed for the reception of bottled goods or the like and when the receptacle 15 is closed, provides a thermos chamber 17$^a$, wherein a rapid and permanent cooling of the contents is provided, so that the said bottled goods will be kept in a cool and palatable condition.

The container 15 is provided with a removable cover 18, which is provided with an insulating lining 19 and with a downwardly extending flange 20, which is adapted to take over the upper outer edge of the container 15. This cover 18 is adapted to rotate upon the container 15 for a purpose presently apparent and if desired, suitable antifriction devices may be provided to facilitate this rotation. The cover is provided with an opening 21 which is normally closed by an insulated door 22. This door is secured to the cover by a spring hinge so that it will remain in closed position.

In the use of the invention, the cover may be rotated to any desired position for the removal of certain specified bottled goods, and the goods may be so positioned within the container that their location may be easily determined so that the door of the cover may be readily positioned for their removal. The container 15 is preferably provided with a drain opening 24.

Located beneath the container 15 is a receptacle 25 which is shaped to fit the frame 13. This receptacle is provided with an opening 26, which is normally closed by a spring actuated hinged door 27 and is designed for the reception of empty bottles. The receptacle 25 is supported by the frame 13 and fits within the uprights 11 and acts to stiffen and reinforce the main supporting frame.

The cover 18 is preferably provided with a container 28 for straws and with a handle or grip 29, whereby the said cover may be conveniently rotated, while if desired, a receptacle 30 may be secured to the supporting frame to receive caps removed from the bottles.

It will be apparent from the foregoing description and accompanying drawings, that the invention provides a convenient and ornamental container whereby bottled or similar goods may be kept on sale in a cool and palatable condition and empty bottles and caps disposed of in a manner to prevent their unsightly accumulation.

One of the advantageous features of the invention resides in its adaptability for self service, so that a customer may wait upon himself. In addition, the dispenser is designed to keep soft drinks, milk or any other sealed package in a cold and palatable condition without the use of large storage ice boxes, the retention of the cold air brought about by the proportion of ice for refrigeration purposes, being of a character to secure a maximum amount of refrigeration with the use of a minimum quantity of ice. This is due to the fact that the cold air provided by the ice or refrigerant within the chamber 17, completely fills the thermos compartment 17$^a$ and when the thermos chamber is open, it will be automatically closed, so that the cold air will not rise and leave the thermos chamber and heated air cannot enter, due to the fact that the chamber is completely filled with cold air and to the time required for the removal of any of the contents.

It may be here mentioned that while the cabinet is shown as cylindrical, it may be made in different form, such as square and the particular arrangement and disposition of the ice compartment and thermos chamber may vary.

By the construction and arrangement shown, it has been found that upon actual test, the dispenser will cool its contents twelve degrees lower than the ordinary refrigerator, which is due to the thermos construction of the chamber 17$^a$.

The invention is susceptible of various changes in its form, proportions and minor details of construction and the right is herein reserved to make such changes as properly fall within the scope of the appended claim.

Having described the invention what is claimed is:—

A refrigerating and dispensing cabinet for bottled goods, comprising a substantially rectangular frame, an angle ring member secured to the top thereof, an open top receptacle supported in the frame, a cylindrical bottle container having insulated walls supported on the flanged ring at the top of the frame, a container for a refrigerant resting centrally on the bottom of the bottle container and designed to establish therebetween a thermos chamber, an insulated frusto-conical top revoluble on the bottle container, said top having an opening therein, a hingedly supported spring influenced door of insulating material for closing said opening, and said bottle container having a drain opening communicating with the receptacle.

In testimony whereof I affix my signature.

MORGAN HOWELLS.